US012476962B2

(12) United States Patent
Panasyuk et al.

(10) Patent No.: US 12,476,962 B2
(45) Date of Patent: Nov. 18, 2025

(54) AUTHENTICATION AND AUTHORIZATION OF REQUESTER APPARATUSES IN NETWORK SYSTEMS

(71) Applicant: Microsoft Technology Licensing, LLC, Redmond, WA (US)

(72) Inventors: Anatoliy Panasyuk, Seattle, WA (US); Luis Irun-Briz, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 3 days.

(21) Appl. No.: 18/602,843

(22) Filed: Mar. 12, 2024

(65) Prior Publication Data

US 2025/0294024 A1    Sep. 18, 2025

(51) Int. Cl.
*H04L 9/40*    (2022.01)

(52) U.S. Cl.
CPC ................. *H04L 63/0846* (2013.01)

(58) Field of Classification Search
CPC .................................................... H04L 63/084
See application file for complete search history.

(56) References Cited

U.S. PATENT DOCUMENTS

| | | | | |
|---|---|---|---|---|
| 8,566,918 B2* | 10/2013 | Radhakrishnan | ... | H04L 63/0807 726/19 |
| 2004/0059939 A1* | 3/2004 | de Jong | ................ | H04L 9/3213 726/28 |
| 2015/0181548 A1* | 6/2015 | Varoglu | ................... | H04W 4/33 455/456.2 |
| 2016/0125412 A1* | 5/2016 | Cannon | .............. | G06Q 20/4014 705/44 |
| 2016/0224776 A1* | 8/2016 | Leow | ....................... | G06F 21/32 |
| 2018/0359241 A1* | 12/2018 | Brockhaus | ............ | H04L 63/062 |

OTHER PUBLICATIONS

Aissaoui et al., "Low Latency of Re-authentication during Handover: Re-authentication using a Signed Token in Heterogeneous Wireless Access Networks", Jul. 2013, International Conference on Wireless Information Networks and Systems, pp. 1-7 (Year: 2013).*

(Continued)

*Primary Examiner* — Kenneth W Chang

(57) ABSTRACT

According to examples, an apparatus includes a processor that receives a request from a requester apparatus to access a target apparatus. The processor may provide a token valid to the requester apparatus upon determining that the requester apparatus is authenticated to access the target apparatus, in which the token complies with and is sent via a centralized authentication and authorization protocol. The processor may also receive an access check message from the target apparatus, in which the access check message includes the token and the identity of the requester apparatus. In addition, the processor may enable the target apparatus to control access to the requester apparatus. The apparatus disclosed herein enable for the retrofitting of secure multi-factor or one-time password authentication into systems that rely on a centralized authentication and authorization protocol, such as the TACACS+ or the RADIUS protocol.

20 Claims, 7 Drawing Sheets

(56) References Cited

OTHER PUBLICATIONS

Kbar, Ghasssan, "Wireless Network Token-Based Fast Authentication", Apr. 2010, 17th International Conference on Telecommunications, pp. 227-233 (Year: 2010).*
Extended European Search Report Received in European Patent Application No. 25159066.7, mailed on Jul. 28, 2025, 06 pages.
Communication pursuant to Rule 69 EPC—reminder concerning payment of the designation fee (Art. 79(2) EPC) and of the examination fee (Art. 94(1) EPC)—and invitation pursuant to Rule 70a(1) Received in European Patent Application No. 25159066.7, mailed on Sep. 22, 2025, 02 pages.

* cited by examiner

AUTHENTICATION AND AUTHORIZATION OF REQUESTER APPARATUSES IN NETWORK SYSTEMS

BACKGROUND

Centralized high-scale operation and management of network switches and other devices require connecting these devices with a suitable centralized Authentication/Authorization/Accounting system (AAA). This is typically done using RADIUS or TACACS+ protocols, which are widely supported by network switches, routers and many other types of devices. While RADIUS works with virtually all routers and switches, TACACS+ only works with Cisco® devices. However, TACACS+ has several advantages over RADIUS. For example, TACACS+ encrypts all packets whereas RADIUS encrypts only passwords while leaving other information unencrypted. Regardless of the protocols used or the encryption levels, it is desirable to prevent the transmission of sensitive information such as usernames and passwords over communication networks due to security threats such as network eavesdropping, sniffing, or snooping attacks.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
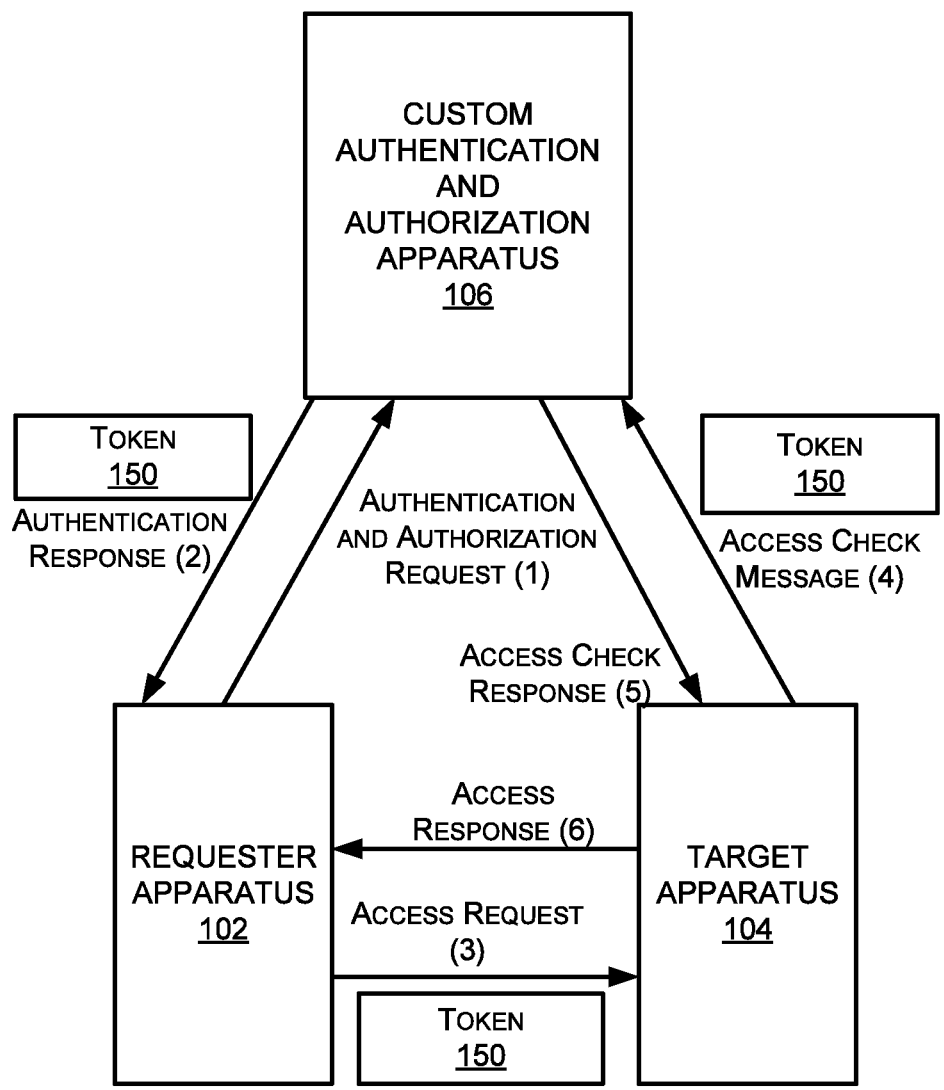
FIG. 1 shows a block diagram of a secure network environment, in which a requester apparatus seeks access to a target apparatus via a custom authentication and authorization apparatus, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to.

TACACS+ and RADIUS protocols are centralized authentication and authorization protocols commonly employed in network switches and many other types of devices for AAA. TACACS+ and RADIUS protocols are currently industry standards for centralized authentication and authorization for network (and other) devices. However, both TACACS+ and RADIUS protocols rely on the use of usernames and passwords as credentials for authentication and authorization, which may create multiple problems and may introduce security weaknesses. For example, if a TACACS+ communication is intercepted and an attacker can obtain the TACACS+ key (which is often shared by multiple devices), the attacker would be able to decrypt credentials and obtain clear-text username and password that can be used to attack multiple systems.

Embodiments are disclosed herein that allow the use of other, more secure forms of authentication in network systems using TACACS+ and RADIUS protocols without changing the protocols themselves, hence maintaining compatibility with devices that support these protocols. In accordance with an embodiment of the present disclosure, a secure network environment includes an authentication and authorization apparatus (or, equivalently, authentication apparatus) that enables a target apparatus to control access of requester apparatuses to resources on the target apparatus. When a requester apparatus seeks to access a target apparatus in the secure network environment, the requester apparatus sends an authentication and authorization request to the authentication apparatus. The authentication apparatus initially determines if the requester apparatus is authenticated to access the target apparatus. The authentication apparatus checks the credentials of the requester apparatus, using a suitable strong authentication scheme (e.g., Multi-Factor Authentication (MFA)). The authentication apparatus may also check if the requester apparatus is authorized to access the target apparatus, e.g., the requester apparatus may have rights to control some of the target apparatuses but not others. In an example, the authentication apparatus may access a database of authenticated users and systems to determine if the requester apparatus is an authenticated user of the secure network environment. For example, the authentication apparatus can determine if the device data of the requester apparatus received in the authentication and authorization request is included in a database of authenticated users and systems. Similarly, the authentication apparatus may further determine if the user credentials from the authentication and authorization request are included in the database of authenticated users and systems.

Following the authentication of the requester apparatus, the authentication apparatus generates a token to be provided to the requester apparatus. The token is set to be valid for a predetermined length of time and can be communicated between the various entities of the secure network environment in specific protocol fields, e.g., a protocol field for exchanging passwords. Accordingly, the authentication apparatus configures the token to satisfy the requirements/limitations generally imposed on passwords such as but not limited to, maximum length and/or acceptable set of characters. The token is stored in combination with the identities of the target device and the requester device as an entry in a data store of a plurality of entries. The token is also provided to the requester apparatus or the user employing the requester apparatus. The requester apparatus in turn presents the token to the target apparatus to secure access to resources of the target apparatus.

The target apparatus in turn transmits the token to the authentication apparatus for verification. In an example, the target apparatus can also transmit along with the token, the identity of the requester apparatus from which the token was received. The authentication apparatus ensures that the token is still valid and authentic by comparing the token with a plurality of entries of a lookup table in a data store. The token is compared with each entry of the lookup table programmatically using for example, string comparison functions or similarity measures. The authentication apparatus may maintain the plurality of entries in the lookup table in which each entry of the plurality of entries includes a token along with identities of a requester apparatus and a target apparatus that received the token from the requester apparatus and a time stamp at which the token was generated. The match between the token and the entry in the lookup table can be determined based on the comparison. In an example, the authentication apparatus deletes entries associated with expired tokens (e.g., tokens whose validity period has ended). The authentication apparatus may transmit a response to the target apparatus allowing or disallowing the requester apparatus from accessing the target apparatus based on the validity determination of the token. For example, if it is determined that the combination of the token along with the identities of the requester apparatus and the target apparatus matches one of the plurality of entries in the lookup table, the target apparatus is enabled to allow the requester apparatus to access the target apparatus. If the combination of the token along with the identities of the requester apparatus and the target apparatus does not match any of the plurality of entries in the lookup table, the authentication apparatus instructs the target apparatus to deny the requester apparatus from accessing the target apparatus.

The use of a custom authentication and authorization apparatus in a secure network environment as discussed herein affords a technical improvement to a technical problem of securing networks from leakage of sensitive data such as usernames and passwords. While additional security measures such as multi-factor authentication (MFA) are implemented in communication networks, they continue to require an exchange of the real plain-text username and password credentials on the protocol level, leaving these credentials exposed to the risks of attacks mentioned above. Even though user names/passwords are encrypted, due to inherent risks of wide-scale compromise of an entire system if a password is leaked or intercepted and decrypted/compromised on a single device, an attacker would be able to use this password to control many devices and compromise the system. The disclosed embodiments do not require the sending of real credentials (usernames and passwords) via TACACS+ or RADIUS protocol messages, protecting these credentials from attacks. Furthermore, the disclosed embodiments allow for the use of accounts with no plain text password such as accounts that use SmartCards, Certificates, or other secure forms of authentication. The disclosed embodiments further enable for the retrofitting of secure multi-factor or one-time password authentication into systems that rely on a centralized authentication and authorization protocol, such as the TACACS+ or the RADIUS protocol.

FIG. 1 shows a block diagram of a secure network environment 100, in which a requester apparatus 102 seeks access to a target apparatus 104 via an authentication and authorization apparatus 106 (hereinafter referred to as 'the authentication apparatus 106'), in accordance with an embodiment of the present disclosure. According to examples, the authentication apparatus 106 verifies the credentials of the requester apparatus 102 and establishes an authentication routine using a token 150 (e.g., a 'nonce') that is valid for a predetermined time to allow the requester apparatus 102 to access the target apparatus 104 and execute intended operations. In an embodiment, the secure network environment 100 is a secure network connecting at least the requester apparatus 102, the target apparatus 104, and the authentication apparatus 106 and implementing one or more authenticating protocols such as but not limited to, Remote Authentication Dial-In User Service (RADIUS) or Terminal Access Controller Access-Control System Plus (TACACS+) protocols to allow communications between the various networked devices. For example, the authentication apparatus 106 includes a custom TACACS+/RADIUS server.

As shown in FIG. 1, the requester apparatus 102 may initially transmit an authentication and authorization request (1) for access to the target apparatus 104 to the authentication apparatus 106. The authentication and authorization request (1) can include an identity of the target apparatus 104. The authentication apparatus 106, on receiving the authentication and authorization request (1) authenticates the requester apparatus 102 via credentials associated with the authentication and authorization request (1). In different examples, the requester apparatus 102 may include authenticating hardware such as a smartcard which enables authentication. Alternatively, the authentication and authorization request (1) may also include credentials such as a username and password. Furthermore, it may be noted that the requester apparatus 102 may be a user device such as a secure laptop, a secure smartphone including the smartcard, etc., and the authentication and authorization request (1) may be initiated by a user.

In an example, the user may initiate the authentication and authorization request (1) explicitly or automatically by attempting to access the target apparatus 104 through a Graphical User Interface (GUI) on the requester apparatus 102. Alternately, the requester apparatus 102 can include a network device, which may be a part of an automation system, and the network device can automatically initiate the authentication and authorization request (1). In the latter case of the requester apparatus 102 being a network device, the authentication credentials may include a password or an authentication certificate configured within the network device.

If the requester apparatus 102 is authenticated, the authentication apparatus 106 provides the token 150 to the requester apparatus 102 within an authentication response (2). In different embodiments, the period of validity for the token 150 may range from a few minutes to a few hours depending on different factors including the configuration of the authentication apparatus 106. The token 150 may be restricted in terms of the maximum number of characters which may include one or more of alphabetic, numeric, and alphanumeric characters. As the token 150 is substituted for username/password fields in network communications, the token 150 can be configured to comply generally with username/password limitations. These limitations may include the type and number of characters that can make up the token 150. For example, the token 150 can be configured from randomly selected keyboard characters thereby allowing users to key in the tokens for accessing the target apparatus 104. Furthermore, the length restrictions on username password fields (e.g., 32 characters/264 characters, etc.) can also be imposed on the token 150. In an example, the token 150 can include additional information such as the number or a code that identifies the particular regional instance of the authentication apparatus 106 that generated the token 150. Regardless of the restrictions imposed, a cryptographically strong token is generated. The token 150 can also be stored in a memory of the authentication apparatus 106 along with other information such as the identity of the target apparatus 104 for which the token 150 was generated and a time stamp indicating the time of token generation.

The requester apparatus 102 receives the token 150 with the authentication response (2) and provides the token 150 to the target apparatus 104 in an access request (3). The target apparatus 104 may treat the token 150 as a password. The target apparatus 104 in turn transmits the token 150 to the authentication apparatus 106 in an access check (4) message. The authentication apparatus 106 checks in the memory, for the token 150 along with the identity of the target apparatus 104 transmitting the token 150. Again, string comparison techniques or similarity functions such as but not limited to, Cosine similarity, Euclidean distance, Pearsons's correlation coefficient can be employed. It may be noted that when employing similarity techniques, an almost 100% similarity is required between the token 150 and the lookup table entry to be identified as a match. Furthermore, the authentication apparatus 106 may institute other checks such as a validity check of the token 150 based for example, on the time stamp of the token generation. If the validity period of the token 150 has not expired and the token 150 along with the identity of the target apparatus 104 matches an entry in the memory, the authentication apparatus 106 signals access request approval to the target apparatus 104 in an access check response (5).

After receiving the access check response (5) from the authentication apparatus 106, the target apparatus 104 determines if the requester apparatus 102 should be allowed access. If the access check response (5) indicates that the requester apparatus 102 is not authenticated, then the requester apparatus 102 may be denied access to the target apparatus 104 in an access response (6). The requester apparatus 102 may be denied if the token 150 sent in the access check (4) does not match any of the valid tokens stored by the authentication apparatus 106 as corresponding to the target apparatus 104.

If the requester apparatus 102 is authenticated, the target apparatus 104 may signal approval of the access request (3) in the access response (6) to the requester apparatus 102. The requester apparatus 102 is not only allowed to access the target apparatus 104 but is also allowed to execute authorized operations. In an example, the validity period of the token 150 may be configured based on the requester apparatus 102 or the user profile associated with the authentication and authorization request (1). The token validity period can be set on the basis of the types of operations the requester apparatus 102 wants to use, e.g., if the requester apparatus 102 is trying to execute a single command, the token validity period can be relatively short, but if the requester apparatus 102 is trying to execute a series of commands or a longer-running job (such as a device reconfiguration script), the token validity period can be set to be longer, to have enough time to execute required commands, while keeping token validity period to be as short as possible. Additionally, the token validity period can be tied to the level of access the token 150 provides. For example, if the requester apparatus 102 (or a user profile accessing the target apparatus 104 from the requester apparatus 102) has limited authorization (e.g., read-only rights), which is relatively less risky, the token validity period may be relatively long. However, if the requester apparatus 102 has greater authorization (e.g., write/administrative rights)) the token 150 validity period is optimized to allow for a greater number or more complex operations while being limited to as short a validity period as possible for security reasons. The token validity period for particular requests may be determined through testing, modeling, historical data, and/or the like.

In an example, the authentication and authorization of the requester apparatus 102 by the authentication apparatus 106 may be known to the user. For example, the user may explicitly send the authentication request (1) to the authentication apparatus 106 to receive the token 150 on a user device (e.g., the requester apparatus 102). The user may be required to enter the token 150 in the access request (3). In the case where the user is required to enter the token 150, a multi-step authentication process may be instituted so that while the user may issue the authentication request (1) with the requester apparatus 102, the token 150 may be received on a user device other than the requester apparatus 102. For example, if the requester apparatus 102 is a laptop, the token 150 may be sent to another user device (e.g., a smartphone) via a Short Message Service (SMS). In an example, the authentication and authorization process described herein may be completely transparent to the user. For example, the requester apparatus 102 can be configured to automatically issue the authentication and authorization request (1) to the authentication apparatus 106 whenever the target apparatus 104 is to be accessed either in a manual operation by a user or in an automatic operation.

In different examples, each of the requester apparatus 102, the target apparatus 104, and the authentication apparatus 106 may be computing devices such as a server, a laptop computer, a desktop computer, a tablet computer, and/or the like. In some examples, the servers can be part of cloud infrastructure, a virtual machine in the cloud infrastructure, a computing device of an Information technology (IT) professional of the cloud infrastructure, a computing device of an IT professional contracted by the service provider of the cloud infrastructure, etc. Furthermore, the various communications exchanged by the different apparatuses in the secure network environment 100 e.g., the authentication and authorization request (1), the authentication response (2), the access request (3), the access check (4), the access check response (5) and the access response (6) can be network messages configured to comply with protocols such as but not limited to, RADIUS and/or TACACS+ protocols implemented by the secure network environment 100.

Figure 2:
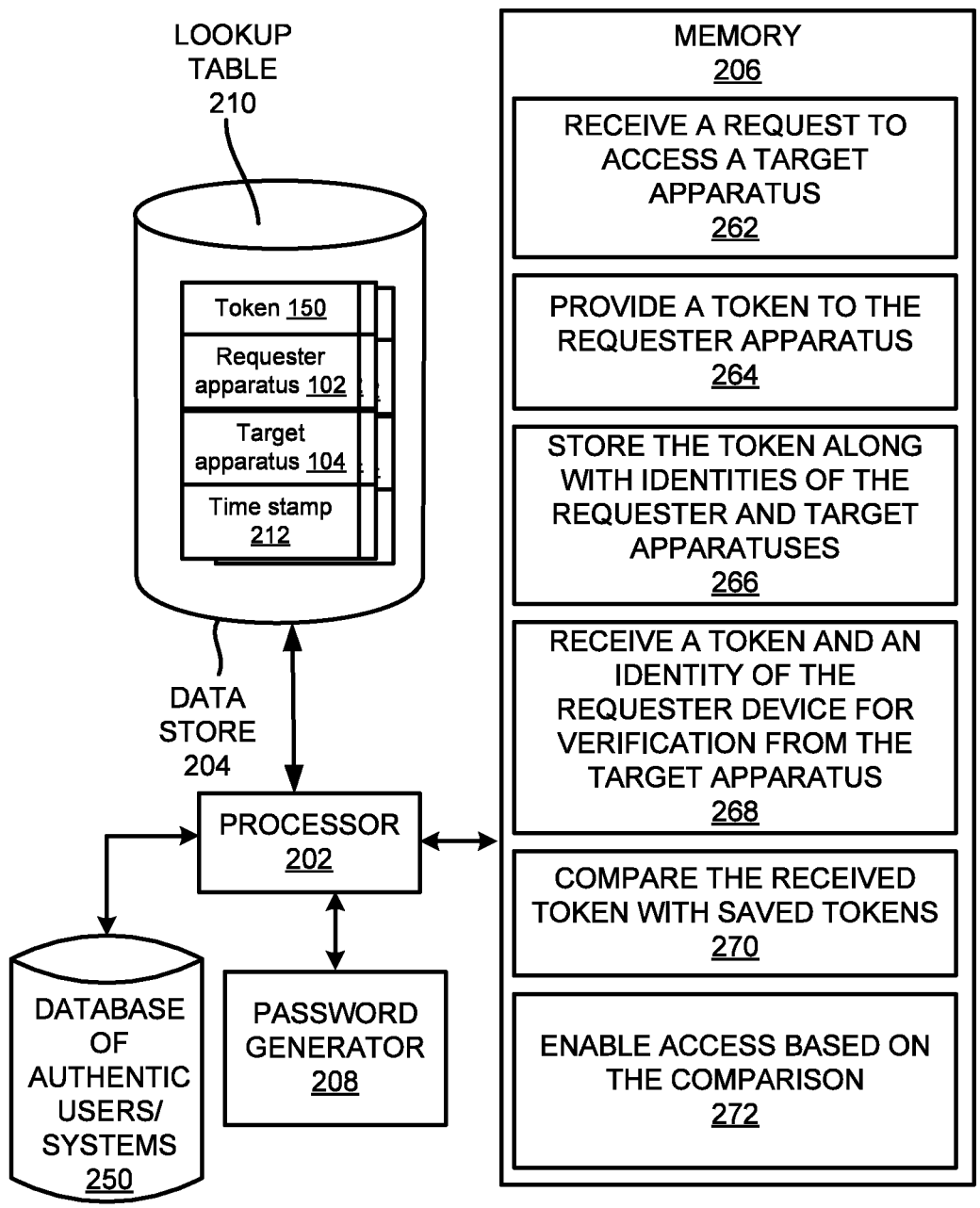
FIG. 2 shows a block diagram of the custom authentication and authorization apparatus shown in FIG. 1, in accordance with an embodiment of the present disclosure.

FIG. 2 shows a block diagram of the authentication apparatus 106 depicted in FIG. 1, in accordance with an embodiment of the present disclosure. With particular reference to FIGS. 1 and 2, the memory 206 has stored thereon machine-readable instructions 262-272 that the processor 202 is to execute. Although the instructions 262-272 are described herein as being stored on the memory 206 and thus include a set of machine-readable instructions, the authentication apparatus 106 may include hardware logic blocks that may perform functions similar to the instructions 262-272. For instance, the processor 202 may include hardware components that may execute the instructions 262-272. In other examples, the authentication apparatus 106 may include a combination of instructions and hardware logic blocks to implement or execute functions corresponding to the instructions 262-272. In any of these examples, the processor 202 may implement the hardware logic blocks and/or execute the instructions 262-272. As discussed herein, the authentication apparatus 106 may also include additional instructions and/or hardware logic blocks such that the processor 202 may execute operations in addition to or in place of those discussed above with respect to FIG. 2.

The processor 202 executes instructions 262 to receive the authentication and authorization request (1) from the requester apparatus 102, which seeks to access and execute certain actions on the target apparatus 104. The target apparatus 104 can be a network device including a server, a user device, or a virtual machine on a cloud. In response to receiving the authentication and authorization request (1), the authentication apparatus 106 verifies if the requester apparatus 102 is permitted to access the target apparatus 104 and the permitted level of access. In an example, the requester apparatus 102 provides authentication credentials such as a username and password or a security certificate with the authentication and authorization request (1). In an example, the requester apparatus 102 is a secure device including hardware such as a smartcard that stores authentication data to be provided to the authentication apparatus 106 to complete an authentication process. The authentication credentials/authentication data can determine the access level or permitted operations for the requester apparatus 102 or an associated user profile on the target apparatus 104. The authentication apparatus 106 can access a database of authenticated users and systems 250 which stores authentication and authorization details of different apparatuses, devices, and users of the secure network environment 100. For example, a user can register more than one user device in the database of authenticated users and systems 250 as a 'trusted device' to receive the token 150 so that multi-factor authentication can be implemented with the token being sent to a different 'trusted device' than the requester apparatus 102.

After authenticating the requester apparatus 102, the processor 202 executes instructions 264 to provide the token 150 in the authentication response (2) to the requester apparatus 102. In an example, the processor 202 can be coupled to a password generator 208, which provides processor-executable instructions for generating random tokens such as the token 150. In an example, the password generator 208 can be implemented as a series of processor-executable instructions stored on the memory 206 and executed by the processor 202 for token generation. As mentioned herein, various restrictions regarding the length, the type of characters to be included, and a period of validity may be set for a random token generated by the random password generator 208 and provided as the token 150 to the requester apparatus 102. In an example, the random password generator 208 may generate the token 150 as a random combination of keyboard characters. The instructions 264 may also cause the processor 202 to transmit an encoded version of the token 150 to the requester apparatus 102 in a password protocol field of an authentication response (2).

Additionally, the processor 202, by executing instructions 266, stores the token 150 along with the identification data of the requester apparatus 102 and the target apparatus 104 and the time stamp 212 in a data structure such as an internal lookup table 210 that includes a plurality of entries. Each entry in the lookup table 210 on the data store 204 includes a token, identification data of a requester apparatus requesting authentication/authorization, and a target apparatus for which the token was issued and a time stamp indicating the time of token generation. Therefore, an entry in the lookup table may include at least four fields, namely, the token, and identification data such as the Internet Protocol (IP) addresses of the requester and the target apparatuses and the time stamp. In some examples, the tokens are held in the lookup table 210 for a short predetermined or preconfigured period of time to limit that time window of potential exposure in case a token is leaked in the secure network environment 100.

The processor 202 executes instructions 268 to receive a token 150 and related data for verification from a target apparatus 104 on the secure network environment 100. In an example, the token 150 can be received in the access check (4) from the target apparatus 104 along with the identity of the requester apparatus 102 that transmitted the token 150 to the target apparatus 104.

After receiving the token 150, the processor 202 executes instructions 270 to compare the received token e.g., the token 150, with the various valid tokens in the lookup table 210. The instructions 270 may cause the processor 202 to verify various attributes of the received token. When the token 150 is received, the processor 202 executes the instructions 270 to match the token 150 with tokens in the lookup table 210. When a match is identified, the attributes of the token 150 can be retrieved from the corresponding record including the validity, the requester apparatus 102, and the target apparatus 104. As mentioned herein, each of fields received in the access check message (4) including the token 150, the IP addresses of the requester and the target apparatuses associated with the token 150 and a time at which the access check message (4) was received can be compared with the entries of the lookup table 210.

The instructions 270 cause the processor 202 to determine if the identities of the target apparatus 104 and the requester apparatus 102 match the corresponding records in the lookup table 210. The comparison and matching are executed programmatically, for example, using string comparison functions, Regular Expressions or similarity techniques included in the instructions 270. In an example, the lookup table 210 can include an additional expiration field that includes a temporal value for token validity starting from the time stamp of the token generation. If at least one field fails to match between the fields received in the access check message (4) and an entry of the lookup table 210 then it is identified as not matching. If the corresponding fields match up and the time of reception of the access check message (4) is within the validity period of the token 150 as compared with the time stamp 212 (and the optional temporal value), the token 150 is determined to be valid. If a match is found, the requester apparatus 102 is authenticated to access the target apparatus 104. The authorized level of access can be retrieved from a database of authenticated users and systems 250, which includes details regarding the authenticated entities including users, devices, and systems of the secure network environment 100 and the access levels of each authenticated entity.

The processor 202 executes instructions 272 to transmit the access check response (5) to the target apparatus 104 enabling the target apparatus 104 to grant or deny access based on the comparison of the token 150 with the entries of the lookup table 210. In the case of the token 150, a match may be identified and the access check response (5) indicates that the requester apparatus 102 be allowed to access the target apparatus 104 in addition to indicating the level of access (authorization) that can be permitted to the requester apparatus 102. In an example, the processor 202 may execute further instructions to remove or delete tokens from the lookup table 210 after a single use regardless of the authentication of a requester apparatus 102.

Figure 3:
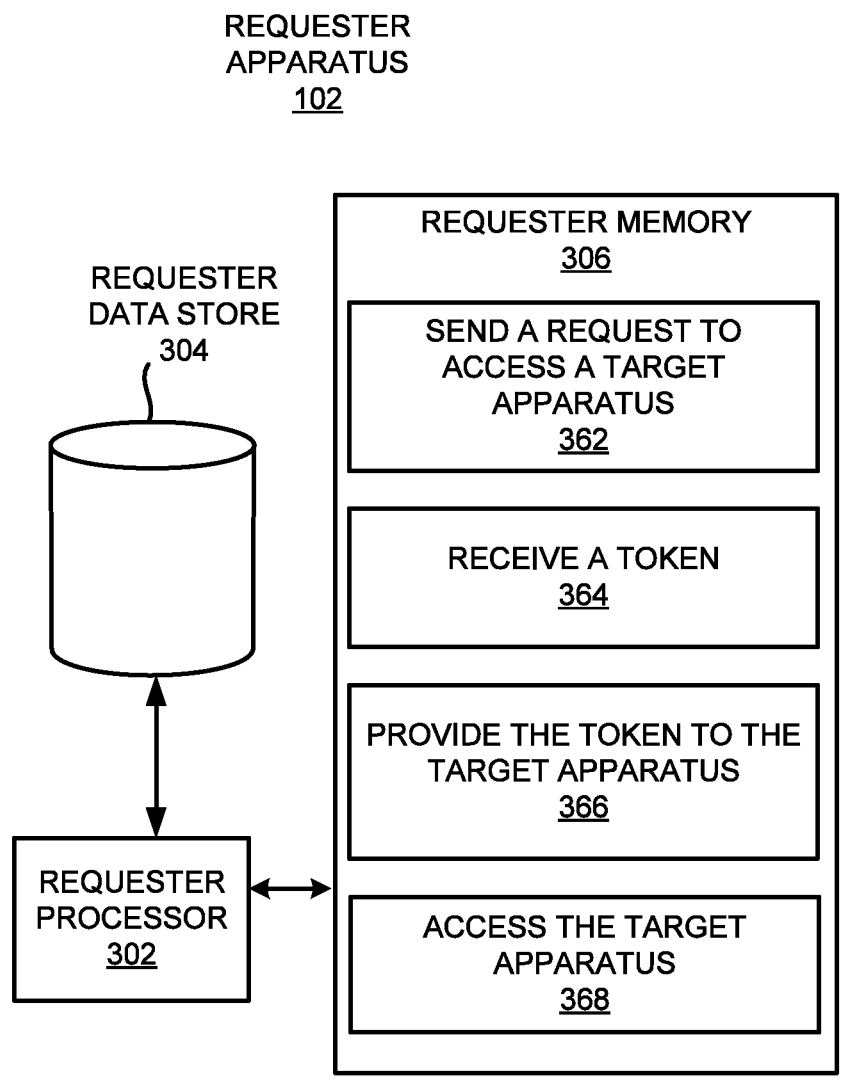
FIG. 3 shows a block diagram of the requester apparatus shown in FIG. 1, in accordance with an embodiment of the present disclosure.

FIG. 3 shows a block diagram of the requester apparatus 102 depicted in FIG. 1, in accordance with an embodiment of the present disclosure. The requester apparatus 102 includes a requester processor 302, a requester data store 304, and a requester memory 306. The requester memory 306 has stored thereon machine-readable instructions 362-368 that the requester processor 302 is to execute. Although the instructions 362-368 are described herein as being stored on the requester memory 306 and thus include a set of machine-readable instructions, the requester apparatus 102 may include hardware logic blocks that may perform functions similar to the instructions 362-368. For instance, the requester processor 302 may include hardware components that may execute the instructions 362-368. In other examples, the requester apparatus 102 may include a combination of instructions and hardware logic blocks to implement or execute functions corresponding to the instructions 362-368. In any of these examples, the requester processor 302 may implement the hardware logic blocks and/or execute the instructions 362-368. As discussed herein, the requester apparatus 102 may also include additional instructions and/or hardware logic blocks such that the requester processor 302 may execute operations in addition to or in place of those discussed above with respect to FIG. 3.

The requester processor 302 executes instructions 362 to send the authentication and authorization request (1) to the authentication apparatus 106 for accessing the target apparatus 104. The authentication and authorization request (1) may be sent by a user explicitly using the requester apparatus 102 in an example. In another example, the authentication and authorization request (1) can be automatically sent when the user attempts to access the target apparatus 104, for example, by selecting an icon a GUI displayed on the requester apparatus 102 so that the transmission of the authentication and authorization request (1) may be transparent to the user. In yet another example, the requester apparatus 102 can be configured to execute some automatic management functions so that the instructions 362 to send the authentication and authorization request (1) are executed as part of the automatic management functions without any human input.

The requester processor 302 executes instructions 364 to receive the token 150 in the authentication response (2). The requester processor 302 executes instructions 366 to send the token 150 to the target apparatus 104 in the access request (3). The requester processor 302 executes instructions 368 to receive the access response (6) from the target apparatus 104. The requester processor 302 can execute further instructions to access the target apparatus 104 and execute one or more operations on the target apparatus 104 if the access response (6) indicates that the requester apparatus 102 is authenticated and authorized to carry out the operations.

Figure 4:
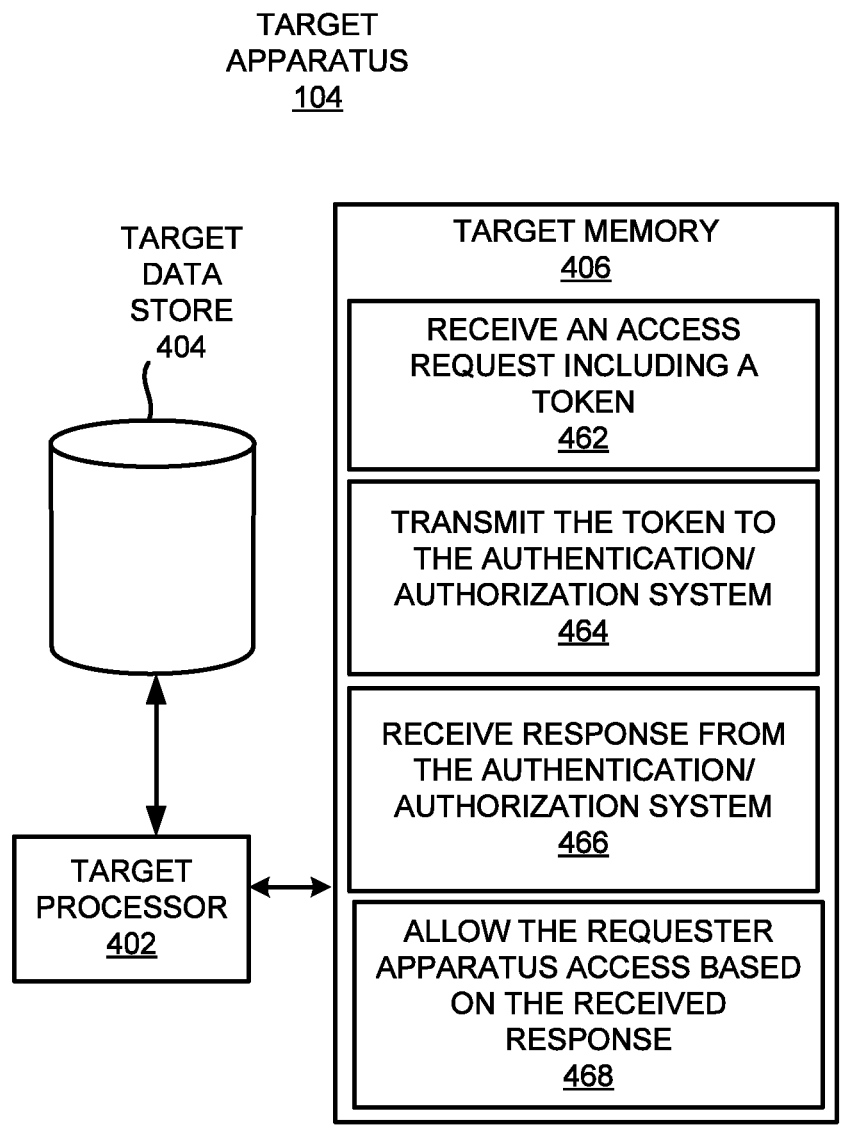
FIG. 4 shows a block diagram of the target apparatus shown in FIG. 1, in accordance with an embodiment of the present disclosure.

FIG. 4 shows a block diagram of the target apparatus 104 depicted in FIG. 1, in accordance with an embodiment of the present disclosure. The target apparatus 104 includes a target processor 402, a target data store 404, and a target memory 406. The target memory 406 has stored thereon machine-readable instructions 462-468 that the target processor 402 is to execute. Although the instructions 462-468 are described herein as being stored on the target memory 406 and thus include a set of machine-readable instructions, the authentication apparatus 106 may include hardware logic blocks that may perform functions similar to the instructions 462-468. For instance, the target processor 402 may include hardware components that may execute the instructions 462-468. In other examples, the target apparatus 104 may include a combination of instructions and hardware logic blocks to implement or execute functions corresponding to the instructions 462-468. In any of these examples, the target processor 402 may implement the hardware logic blocks and/or execute the instructions 462-468. As discussed herein, the target apparatus 104 may also include additional instructions and/or hardware logic blocks such that the target processor 402 may execute operations in addition to or in place of those discussed above with respect to FIG. 4.

The target processor 402 executes instructions 462 to receive an access request including a token from a requester apparatus 102. For example, the target apparatus 104 may execute the instructions 462 to receive the access request (3) including the token 150. The token 150 can be extracted from the access request (3) and transmitted to the authentication apparatus 106 in the access check (4) by executing instructions 464. The access check response (5) indicating if the requester apparatus 102 is authenticated to access the target apparatus 104 is received from the authentication apparatus 106 by executing the instructions 466. Based on the indication in the access check response (5) from the authentication apparatus 106, the requester apparatus 102 may be allowed or disallowed access by executing instructions 468. In an embodiment, the instructions 468 can cause the target processor 402 to send out the access response (6) accordingly.

With respect to FIGS. 1, 2, 3, and 4, each of the various processors including the processor 202, the requester processor 302, and the target processor 402 is a semiconductor-based microprocessor, a central processing unit (CPU), an application-specific integrated circuit (ASIC), a field-programmable gate array (FPGA), and/or other hardware device. The memory 206, the requester memory 306, and the target memory 406 may each also be termed a computer-readable medium and is, for example, a Random Access memory (RAM), an Electrically Erasable Programmable Read-Only Memory (EEPROM), a storage device, or the like. In some examples, each of the memories 206, 306, and 406 is a non-transitory computer-readable storage medium, where the term "non-transitory" does not encompass transitory propagating signals. In any regard, the memories 206, 306, and 406 have stored thereon machine-readable instructions executable respectively by processors 202, 302, and 402. Similarly, each of the data stores 204, 304, and 404 may also be a Random Access memory (RAM), an Electrically Erasable Programmable Read-Only Memory (EEPROM), a storage device, or the like.

Although each of the authentication apparatus 106, the target apparatus 104, and the requester apparatus 102 is depicted as having a single processor it should be understood that the authentication apparatus 106, the target apparatus 104, and the requester apparatus 102 may each include additional processors and/or cores without departing from a scope of the authentication apparatus 106, the target apparatus 104, and the requester apparatus 102. In this regard, references to a single processor 202, 302, 402 as well as to a single memory 206, 306, and 406 may be understood to additionally or alternatively pertain to multiple processors 202, 302, 402, and/or multiple memories 206, 306 and 406. In addition, or alternatively, the processor 202 and the memory 206 may be integrated into a single component, e.g., an integrated circuit on which both the processor 202 and the memory 206 may be provided. Similar integration into a single component is also possible with the processors 302, and 402 and their respective memories 306 and 406. In addition, or alternatively, the operations described herein as being performed by the processor 202/302/402 can be distributed across multiple corresponding apparatuses 106/102/104 and/or multiple processors 202/302/402.

Figure 5A:
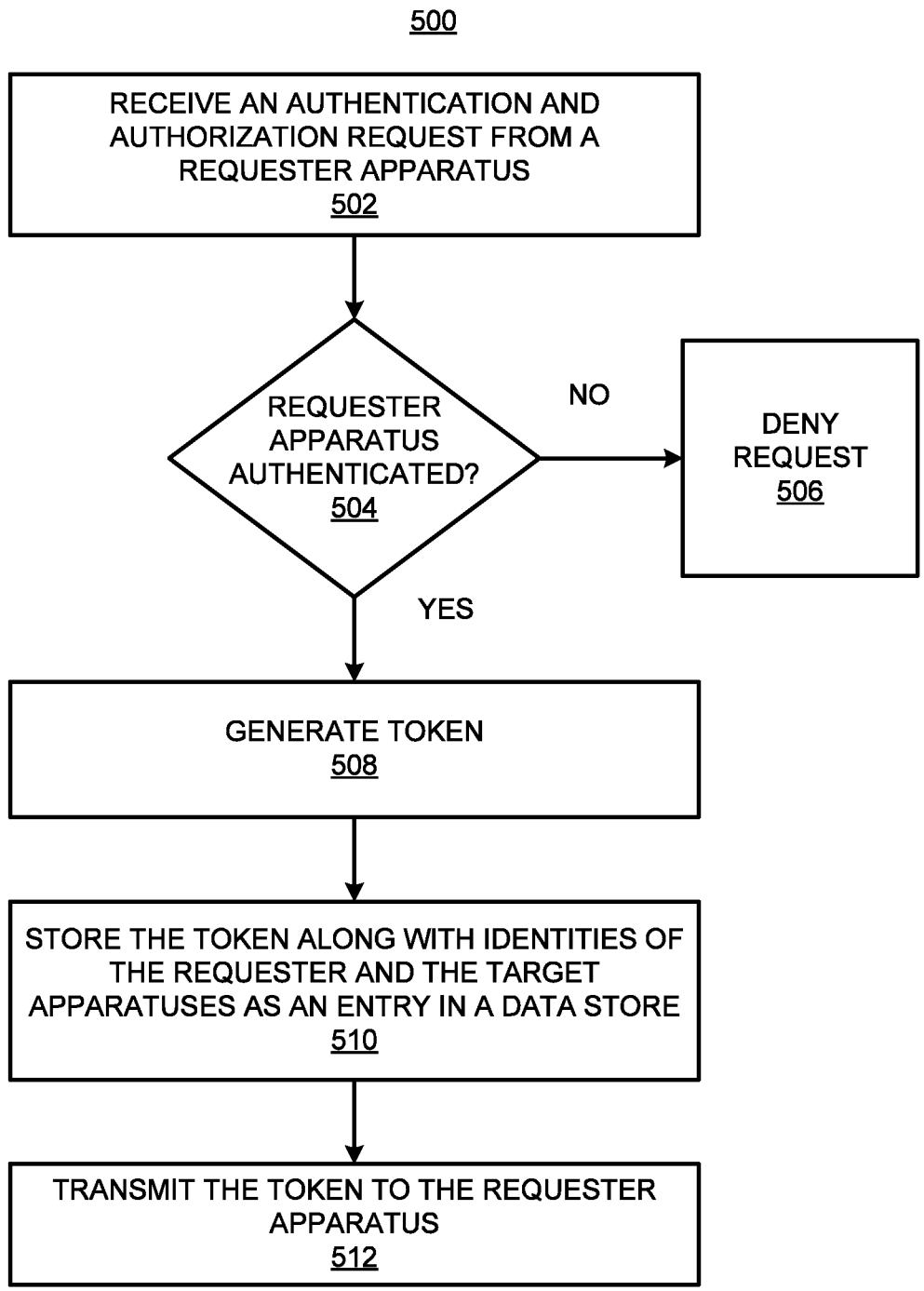
FIG. 5A depicts a flow diagram of a method for a requester apparatus to request access to a target apparatus, in accordance with an embodiment of the present disclosure.
Figure 5B:
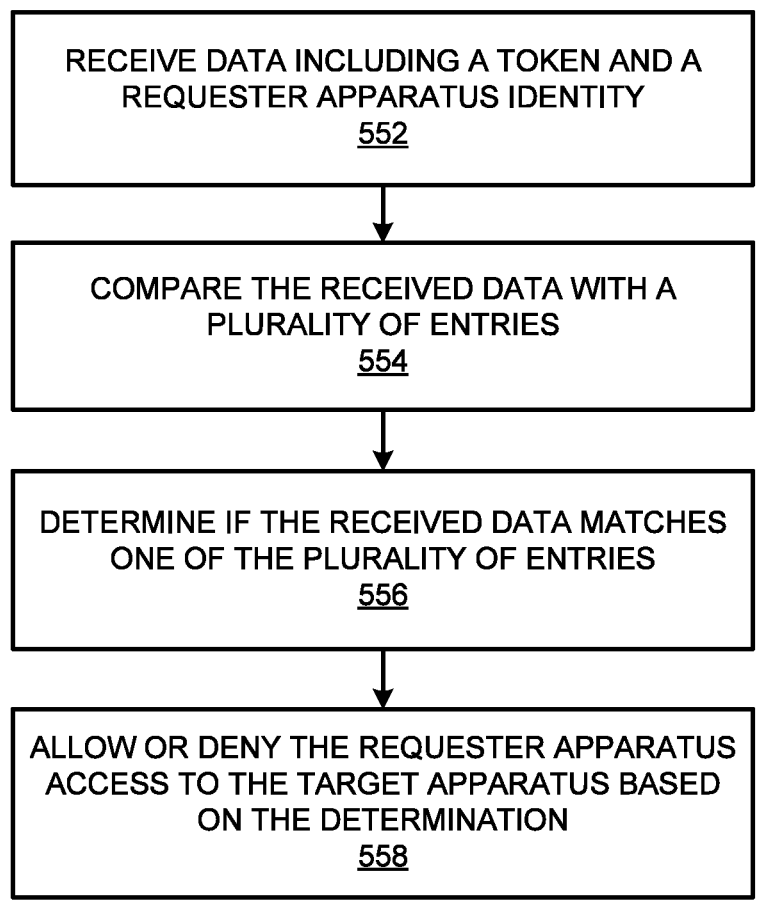
FIG. 5B depicts a flow diagram of a method of enabling a target apparatus to control access of a requester apparatus, in accordance with an embodiment of the present disclosure.

Various manners in which the processor 202 of the authentication apparatus 106 operates are discussed in greater detail with respect to the methods 500 and 550 respectively depicted in FIGS. 5A and 5B. Particularly, FIG. 5A depicts a flow diagram of a method 500 of gaining access to the target apparatus 104 by the requester apparatus 102, in accordance with embodiments of the present disclosure. It should be understood that the method 500 may include additional operations and that some of the operations described therein may be removed and/or modified without departing from the scope of the method 500. The description of the method 500 is made with reference to the features depicted in FIGS. 1 through 4 for purposes of illustration.

At block 502, the processor 202 receives authentication, and authorization request (1) is received from the requester apparatus 102. The requester apparatus 102 sends the authentication and authorization request (1) to obtain access to the target apparatus 104. In response to receiving the authentication and authorization request (1) from the requester apparatus 102, the processor 202 determines at block 504 if the requester apparatus 102 is an authenticated device permitted to access the secure network. The determination regarding the authenticity of the requester apparatus 102 can be made by accessing the database of authenticated users and systems 250 which stores authentication and authorization details of different apparatuses, devices, and users of the secure network environment 100.

If it is determined that the requester apparatus 102 or a user employing the requester apparatus 102 is not authenticated to access the target apparatus 104, then the authentication and authorization request (1) is denied by the authentication apparatus 106 as noted at block 506. If it is determined that the requester apparatus 102 is an authenticated user of the secure network environment 100, then the token 150 is generated at block 508. In some examples, the token 150 is valid for a predetermined time period, which may vary from a few minutes to a few hours depending on various factors outlined herein including but not limited to the access privileges associated with the user and/or the requester apparatus 102 making the authentication and authorization request (1). Upon being created, a combination of the token 150 along with the identities of the requester apparatus 102 and the target apparatus 104 is stored at block 510 as an entry in the lookup table 210 on the data store 204. The token 150 thus generated is transmitted at block 512 to the requester apparatus 102 in the authentication response (2).

FIG. 5B depicts a flow diagram of a method 550 of enabling the target apparatus 104 to control access of the requester apparatus 102, in accordance with an embodiment of the present disclosure. At block 552, the processor 202 of the authentication apparatus 106 receives data including a token and identity of a requester apparatus 102 in the access check (4) from the target apparatus 104. At block 554, the processor 202 compares the data received in the access check (4) with the plurality of entries on the lookup table 210 saved in the data store 204. Each of the plurality of entries includes a token along with identities of a requester apparatus and a target apparatus that received the token from the requester apparatus.

At block 556, based on the comparison from block 554, the processor 202 determines if a combination of the token 150 along with the identities of the requester apparatus 102 and the target apparatus 104 in the received data matches one of the plurality of entries in the lookup table 210. At block 558, the processor 202 transmits the access check response (5) to the target apparatus 104. The access check response (5) allows or disallows the requester apparatus 102 from accessing the target apparatus 104 based on the determination made at block 556.

If it is determined at block 556, that the combination of the token along with the identities of the requester apparatus and the target apparatus in the received data from the block 552 matches one of the plurality of entries in the lookup table 210, the requester apparatus 102 may access the target apparatus 104 sending the data. If it is determined at block 556, based on the comparison from block 554, that the combination of the token along with the identities of the requester apparatus 102 and the target apparatus 104 in the received data from the block 552 does not match any of the plurality of entries, the target apparatus 104 sending the data, is enabled for disallowing or denying access to the requester apparatus 102 identified in the data.

In some examples, some or all of the operations set forth in the methods 500 and 550 are included as utilities, programs, or subprograms, in any desired computer-accessible medium. In some examples, the methods 500 and 550 are embodied by computer programs, which may exist in a variety of forms both active and inactive. For example, the computer programs exist as machine-readable instructions, including source code, object code, executable code, or other formats. Any of the above, in some examples, are embodied on a non-transitory computer-readable storage medium.

Figure 6:
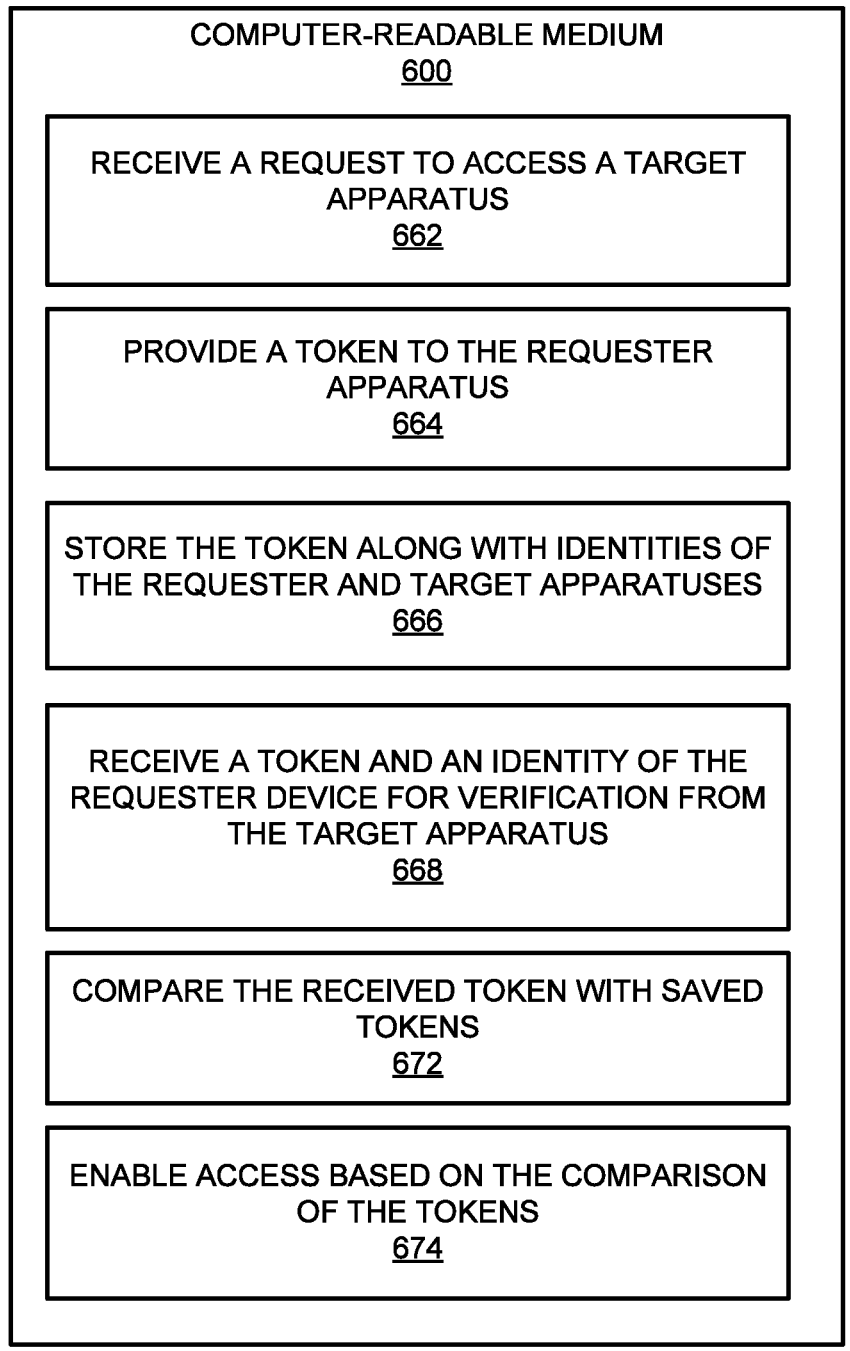
FIG. 6 shows a block diagram of a computer-readable medium that has stored thereon computer-readable instructions for enabling a target apparatus to control access of a requester apparatus, in accordance with an embodiment of the present disclosure.

Turning now to FIG. 6, there is shown a block diagram of a computer-readable medium 600 that has stored thereon computer-readable instructions for enabling a target apparatus to control access of the requester apparatus 102, in accordance with an embodiment of the present disclosure. It should be understood that the computer-readable medium 600 depicted in FIG. 6 may include additional instructions and that some of the instructions described herein may be removed and/or modified without departing from the scope of the computer-readable medium 600 disclosed herein. In some examples, the computer-readable medium 600 is a non-transitory computer-readable medium, in which the term "non-transitory" does not encompass transitory propagating signals.

As shown in FIG. 6, the computer-readable medium 600 has stored thereon computer-readable instructions 662-672 that a processor, such as a processor 202 of the authentication apparatus 106 depicted in FIGS. 1 and 2, executes. The computer-readable medium 600 is an electronic, magnetic, optical, or other physical storage device that contains or stores executable instructions. The computer-readable medium 600 is, for example, Random Access memory (RAM), an Electrically Erasable Programmable Read-Only Memory (EEPROM), a storage device, an optical disc, and the like.

The processor executes the instructions 662 to receive the authentication and authorization request (1) from the requester apparatus 102 seeking access to the target apparatus 104.

The processor executes instructions 664 to provide a token valid for a predetermined time e.g., the token 150, to the requester apparatus 102 upon determining that the requester apparatus 102 is authenticated to access the target apparatus 104.

The processor executes instructions 666 to store data including a combination of the token 150 along with identity data of the target apparatus 104 and the requester apparatus 102.

The processor executes instructions 668 to receive the access check (4) from the target apparatus 104, wherein the access check (4) includes the token 150 and the identity of the requester apparatus 102.

The processor executes instructions 670 to compare received data including the token 150 and the identity of the requester apparatus 102 received in the access check message (4) and the identity of the target apparatus 104 with the entries of the lookup table 210.

The processor executes instructions 672 to enable the target apparatus 104 to control access of the requester apparatus 102 based at least on the results of the comparison obtained by executing the instructions 670.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine-readable instructions that when executed by the processor, cause the processor to:
      receive an authentication and authorization request from a requester apparatus to access a target apparatus;
      provide a token valid for a predetermined time to the requester apparatus upon determining that the requester apparatus is authenticated to access the target apparatus, wherein the token complies with and is sent via a centralized authentication and authorization protocol;
      store data comprising a combination of the token along with identity data of the target apparatus and the requester apparatus in a lookup table;
      receive an access check message from the target apparatus, wherein the access check message includes the token and an identity of the requester apparatus;
      compare the token and the identity of the requester apparatus received in the access check message and identity of the target apparatus with the stored data in the lookup table; and
      enable the target apparatus to control access by the requester apparatus based at least on the comparison.

2. The apparatus of claim 1, wherein the instructions to determine that the requester apparatus is authenticated to access the target apparatus cause the processor to:
   determine if device data of the requester apparatus received in the authentication and authorization request is included in a database of authentic users and systems.

3. The apparatus of claim 1, wherein the instructions to determine that the requester apparatus is authenticated to access the target apparatus cause the processor to:
   determine if user credentials received in the authentication and authorization request are included in a database of authentic users and systems.

4. The apparatus of claim 1, wherein the instructions to provide the token cause the processor to:
   generate the token as a combination of random keyboard characters; and
   set a validity period for the token, wherein the token is deleted from the lookup table on expiry of the validity period.

5. The apparatus of claim 4, wherein the instructions to set the validity period for the token cause the processor to:
   set the validity period for the token based at least on an authorization profile associated with the authentication and authorization request.

6. The apparatus of claim 1, wherein the instructions to provide the token cause the processor to:
   transmit the token to a trusted device registered by a user making the authentication and authorization request, wherein the trusted device is a different device than the requester apparatus.

7. The apparatus of claim 1, wherein the instructions to provide the token cause the processor to:
   transmit an encoded version of the token in a password protocol field of an authentication response.

8. The apparatus of claim 1, wherein the instructions to compare the token and the identity of the requester apparatus received in the access check message and identity of the target apparatus with the stored data in the lookup table cause the processor to:
   use one or more of string comparison functions and similarity techniques for the comparison of the token and the identity of the requester apparatus received in the access check message and identity of the target apparatus with the stored data; and
   identify an entry in the stored data as a match based on a corresponding output of the string comparison functions and similarity techniques.

9. The apparatus of claim 1, wherein the instructions to enable the target apparatus to control access to the requester apparatus cause the processor to:
   enable the target apparatus to authenticate the requester apparatus to access the target apparatus when the combination of the token and identities of the requester apparatus and the target apparatus matches an entry in the lookup table; or
   enable the target apparatus to deny access to the requester apparatus when the token and identities of the requester apparatus and target apparatus do not match at least one entry in the lookup table.

10. The apparatus of claim 9, wherein the instructions to enable the target apparatus to control access to the requester apparatus cause the processor to:
    enable the target apparatus to authorize the requester apparatus to execute operations on the target apparatus based on an authorization profile associated with one of the requester apparatus or a user associated with the requester apparatus.

11. The apparatus of claim 1, wherein the centralized authentication and authorization protocol comprises a Remote Authentication Dial-In User Service (RADIUS) protocol or a Terminal Access Controller Access-Control System Plus (TACACS+) protocol.

12. The apparatus of claim 1, wherein the instructions to determine that the requester apparatus is authenticated cause the processor to:
verify if a device identification data of the requester apparatus is included in a data store of authenticated users and devices.

13. A method comprising:
receiving, by a processor, from a target apparatus on a secure network, data including a token and identities of a requester apparatus and the target apparatus, wherein the requester apparatus transmitted the token to the target apparatus in an access request message;
comparing, by the processor, the received data with a plurality of entries saved in a data store, wherein at least one entry of the plurality of entries includes a token along with a requester apparatus and a target apparatus that received the token from the requester apparatus, wherein the tokens in the plurality of entries comply with a centralized authentication and authorization protocol;
determining, by the processor based on the comparison, if a combination of the token along with the identities of the requester apparatus and the target apparatus in the received data matches one of the plurality of entries; and
transmitting, by the processor, an access check response allowing or disallowing the requester apparatus from accessing the target apparatus based on the determination.

14. The method of claim 13, further comprising:
receiving, by the processor, an authentication and authorization request from the requester apparatus identified in the received data, wherein the authentication and authorization message is received before receiving the data.

15. The method of claim 14, further comprising:
determining, by the processor, if the requester apparatus sending the authentication and authorization request is permitted to access the target apparatus;
generating, by the processor, the token in the received data upon the determination that the requester apparatus is permitted to access the secure network, wherein the token is valid for a predetermined time; and
storing, by the processor, the token as one of the plurality of entries in the data store.

16. The method of claim 15, further comprising:
determining, by the processor and based on the comparison, that the combination of the token along with the identities of the requester apparatus and the target apparatus in the received data matches one of the plurality of entries; and
enabling, by the processor, the target apparatus sending the data including the token, to allow the requester apparatus identified in the data to access the target apparatus.

17. The method of claim 14, further comprising:
determining, by the processor and based on the comparison, that the combination of the token and the identities of the requester apparatus and the target apparatus in the received data does not match at least one entry of the plurality of entries; and
enabling, by the processor, the target apparatus to deny the requester apparatus from accessing the target apparatus.

18. The method of claim 13, wherein the centralized authentication and authorization protocol comprises a Remote Authentication Dial-In User Service (RADIUS) protocol or a Terminal Access Controller Access-Control System Plus (TACACS+) protocol.

19. A non-transitory computer-readable medium on which is stored a plurality of instructions that when executed by a processor, cause the processor to:
receive an authentication and authorization request from a requester apparatus to access a target apparatus;
provide a token valid for a predetermined time to the requester apparatus upon determining that the requester apparatus is authenticated to access the target apparatus, wherein the token complies with and is sent via a Remote Authentication Dial-In User Service (RADIUS) protocol or a Terminal Access Controller Access-Control System Plus (TACACS+) protocol;
store data including a combination of the token along with identity data of the target apparatus and the requester apparatus in a lookup table;
receive an access check message from the target apparatus, wherein the access check message includes the token and an identity of the requester apparatus;
compare the token and the identity of the requester apparatus received in the access check message and identity of the target apparatus with the stored data in the lookup table; and
enable the target apparatus to control access by the requester apparatus based at least on the comparison.

20. The computer-readable medium of claim 19, wherein the instructions to provide the token cause the processor to:
automatically generate the token to comply with limitations associated with a password that conforms to the Remote Authentication Dial-In User Service (RADIUS) protocol or a Terminal Access Controller Access-Control System Plus (TACACS+) protocol.

* * * * *